United States Patent [19]

Jusinskas, Jr.

[11] 4,298,774
[45] Nov. 3, 1981

[54] CALL WAITING SIGNAL ARRANGEMENT
[75] Inventor: Julius Jusinskas, Jr., Glen Ellyn, Ill.
[73] Assignee: GTE Automatic Electric Labs Inc., Northlake, Ill.
[21] Appl. No.: 35,139
[22] Filed: May 2, 1979
[51] Int. Cl.³ .................... H04M 3/02; H04M 3/42
[52] U.S. Cl. ......................... 179/18 BG; 179/18 HB
[58] Field of Search ........ 179/18 HB, 27 FC, 27 FD, 179/84 C, 84 L, 84 B, 18 BG, 18 J, 18 FA, 18 F

[56] References Cited

U.S. PATENT DOCUMENTS

| | | | |
|---|---|---|---|
| 3,050,592 | 8/1962 | Burgener | 179/84 C X |
| 4,081,613 | 3/1978 | Reines et al. | 179/18 J |
| 4,140,882 | 2/1979 | Regan et al. | 179/84 L |
| 4,145,577 | 3/1979 | Kojima et al. | 179/18 HB |

FOREIGN PATENT DOCUMENTS 2514657  10/1976  Fed. Rep. of Germany ... 179/27 FC

Primary Examiner—Thomas W. Brown
Attorney, Agent, or Firm—Robert J. Black; Charles A. Doktycz

[57] ABSTRACT

A telephone call waiting signal system as used in a processor controlled exchange, wherein reuse is made of an existing ringing supply bus and the signal relay in each subscriber's line equipment for applying a call waiting signal to the subscriber's line. This is made possible by the multiplexing of the two signals and selectively operating the signal relay at the line equipment.

2 Claims, 4 Drawing Figures

PHASED RINGING TIMING

CALL WAITING SIGNAL ARRANGEMENT

BACKGROUND OF THE INVENTION

1. Field of the Invention

The present invention relates in general to telephone systems, and more particularly to a message-waiting signalling arrangement for use in a PBX telephone system.

2. Description of the Prior Art

The concepts of message waiting have been applied principally to private branch exchange telephone systems. In such systems a central switchboard operator controls the message-waiting indicators using additional switching and access circuitry consisting of manually operated keys and signalling lamps.

When it was required to signal a station that a call is waiting, the attendance was required to dial the station line number and then operate a "call waiting" key at the attendance position. A lamp at the called station would then flash on and off, indicating that a call is waiting for this particular station.

The additional circuitry included an access relay for each subscriber station arranged for this feature as well as a signal distribution bus and control arrangements therefor.

SUMMARY OF THE INVENTION

It is, therefore, an object of the present invention to provide a telephone system including a call waiting feature which is relatively inexpensive and simple in its implementation.

The invention provides the call message waiting feature in a switching system of the type generally described in U.S. Pat. No. 4,007,338. This is a PCM switching system wherein the terminal equipment is interconnected via a time channel assigned to the terminal equipment as required. The terminal equipment for a station line includes the usual battery feed arrangements and a ringing current connect relay for applying the ringing signal from a common bus to a station under a central control arrangement. The ringing signal is applied to the station line conductors in bursts, controlled by a ringing interrupter associated with the ringing signal generator.

This ringing equipment is reused to apply the call message waiting signal. To accomplish this the system is placed in a software controlled phase ringing arrangement. This means that in a given 4 second interval, a defined time period exists for ringing as well as for applying the Call Message Waiting potential.

The potential is applied by a central processor controlled relay either in series with the ringing voltage bus or as an "OR" function thru the normally closed contacts of the zero phase detector relay. The ringing cycle arrangement provides a one second "on" period and a one second "off" period. The call message waiting cycle is interlaced with the ringing cycle and has a one second "off" period followed by a one second "on" second. This is illustrated in FIG. 2.

The potential required to fire the neon lamp indicator is borrowed from the ringing generator of the system. The ringing voltage is rectified and applied to the ring relays of all line cards.

DESCRIPTION OF THE PREFERRED EMBODIMENT

Figure 1:
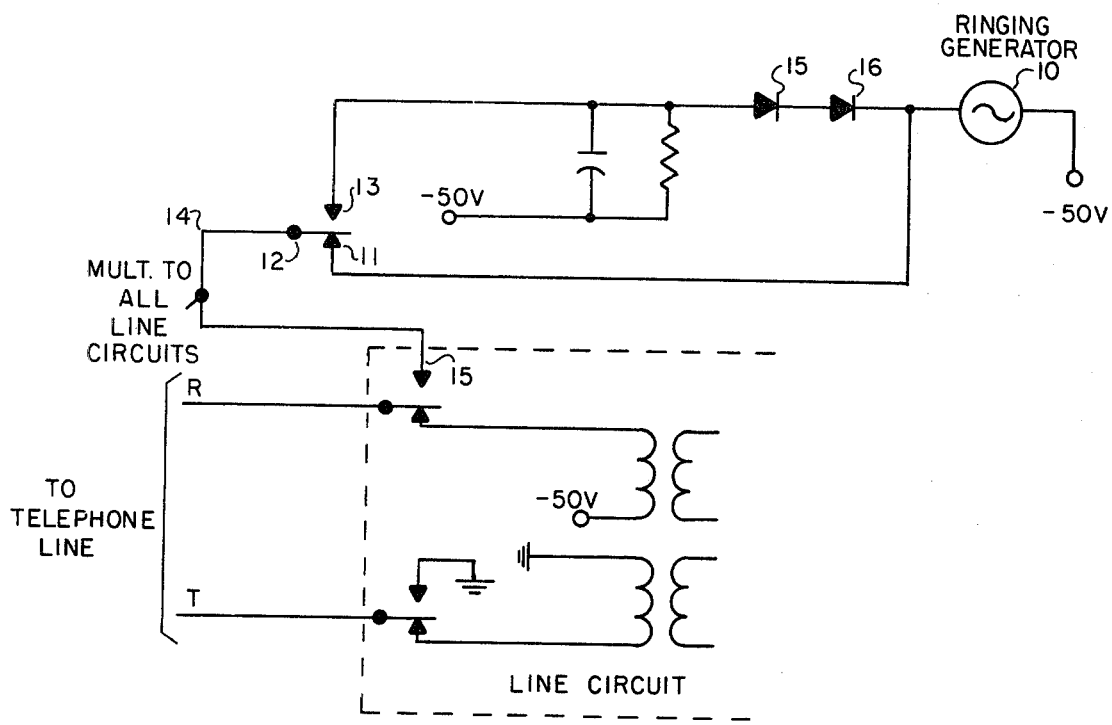
FIG. 1 is an abstracted schematic view of an embodiment of the present invention.

As illustrated in FIG. 1, the essential elements of an exchange for signalling a subscriber's line consist of a ringing signal generator 10 connected via the break contact 11 and armature contact 12 of a phase control relay, not shown, to a ringing signal bus 14. Which bus is then connected to the make contacts such as 15 of every circuit, at the time it is desired to ring a station associated with a particular line circuit.

Figure 2:
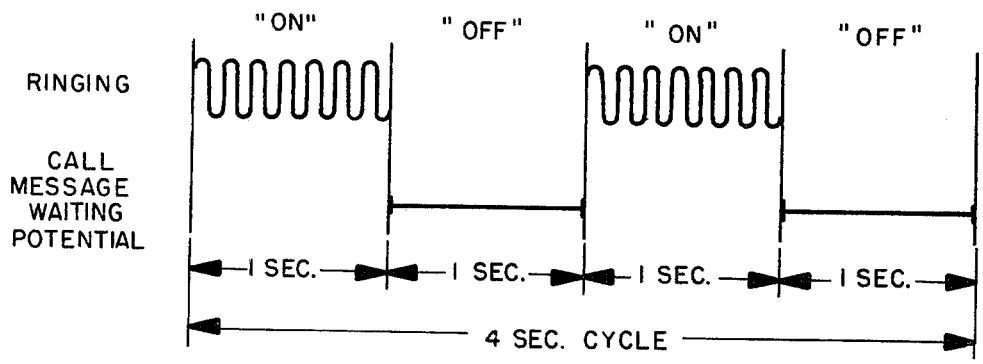
FIG. 2 is a timing diagram showing the interlace of the ringing signal with the call waiting signal.

As is the general practice the ringing signal is not a continuous signal but consists of bursts of about 1 second duration followed by a 1 second silent interval. This is shown in FIG. 2. This silent interval is provided by periodically operating the phase control relay to interrupt the ringing current. During the silent interval, the ringing signal multiple or bus 14 to the line circuits, is idle. By adding a make contact 13 to which is connected a call waiting potential, the bus 14 may be reused during what would otherwise be an idle period. The call waiting signal is a direct current potential of about 120 volts that is applied to the line conductor to fire a neon signal lamp at the station apparatus site. The call waiting signal can be a battery source or could very readily be obtained by rectifying the ringing signal as shown by rectifiers 15 and 16. Thus the phase control relay, the ringing signal bus and the signal applying relays of the line circuits are utilized for the application of both the ringing signal and the call waiting signal at alternate time intervals.

Figure 3:
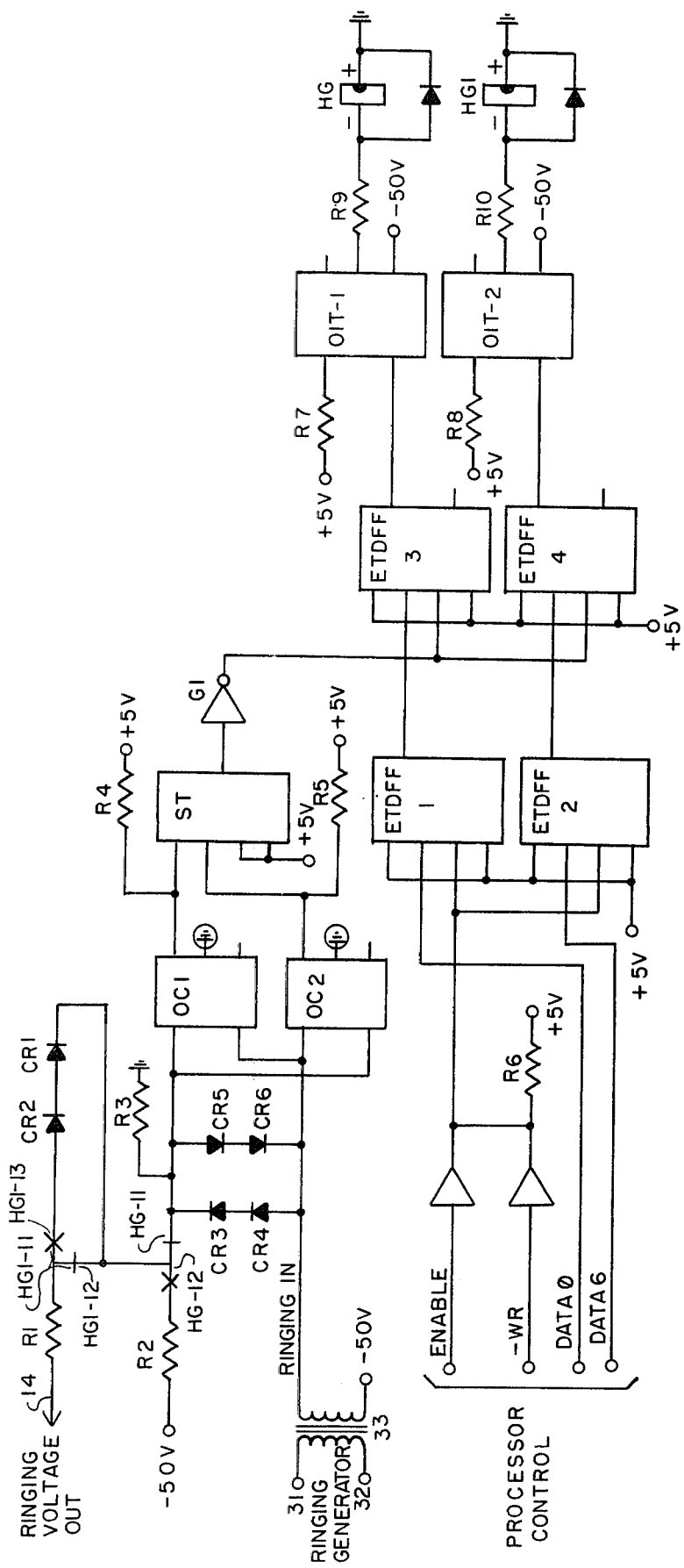
FIG. 3 is a schematic of the preferred embodiment of the present invention.

Referring to FIG. 3 there is shown a schematic of the circuitry used in an embodiment of this invention.

Figure 4:
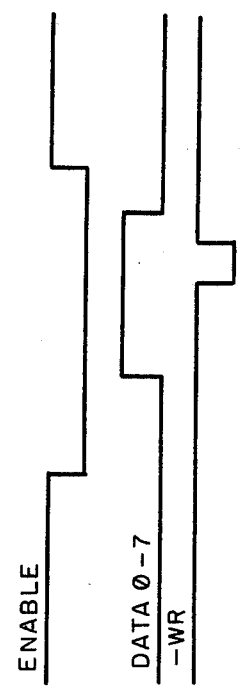
FIG. 4 is a timing diagram showing the timing of the control signals from the central processor.

Ringing voltage from the ringing generator, not shown, is connected at terminals 31 and 32 to the input of a transformer 33. The second winding of the transformer has one terminal connected to a negative 50 volt source to bias the ringing current by a −50 volts D.C. This is a common practice in the telephone industry. The other terminal of the second winding of transformer 33 is connected to the inputs of optical couplers OC1 and OC2 and diodes CR4 and CR6. Optical couplers "OC1", "OC2" and diodes CR3-CR6 comprise the $\phi$ phase detector circuitry for synchronizing the timing interval with ringing current so that switching can be performed at the instant of no ringing current flow. The outputs of both optical couplers "OC1" and "OC2" are gated by a "SCHMITT TRIGGER" device ST, the output of which is amplified at G1 and used to strobe two edge trigger flip-flops ETDFF-3 and ETDFF-4. The input to these two flip-flops is controlled via the timing input terminals "Enable" and "Write" and data bits at terminals $\phi$ and 6. These timing inputs as shown in FIG. 4 are taken from the central processor and are the same as those used to control the peripheral addressing and memory write operations. The "enable" signal is a decoded hardware identity of this circuit, which is a 6 bit address. The "−WR" signal is the processor write instruction and it occurs during the middle of the data highway bit transmission period. It is in essence a strobe to extract the value on the data bus. The signal Data $\phi$-7 are from the 8 bit data highway and are enabled during the middle of the enable signal. The other uses of these signals are not pertinent to this disclosure but may be learned from the referenced U.S. Pat. No. 4,007,338. The processor timing and control arrangement functions to set the temporary buffers ETDFF-1 and ETDFF-2 as required. The $\phi$ data bit is the instruction to operate or release relay HG, and the data bit 6 is the instruction to operate or release relay HG1.

During the "ON" portion of the ringing cycle relay "HG" is not operated and provides the ringing signal voltage from the generator thru the $\phi$ phase detector logic, thru the relay HG normally closed contacts HG-11 and HG-12, thru relay HG1 normally closed contacts HG1-11 and HG1-12 and to the ringing voltage output bus 14.

When the 1 second "ON" cycle is over the processor sends the instruction via data bit $\phi$ to operate relay HG. This instruction is stored in flip-flop ETDFF-1 and during the next $\phi$ phase cycle of the ringing voltage the data is strobed into flip-flop ETDFF-3 by the "SCHMITT TRIGGER" device "ST". This forward bias turns on optical coupler OIT-1 and relay HG operates, thus removing the ringing voltage from the ringing voltage buss. During the next 100 milliseconds all the ring relays that were operated are now released. At the end of this 100 millisecond period the processor instructs our logic to operate relay HG1 via data bit 6 and release relay HG via data bit $\phi$.

This now begins the "OFF" ringing cycle, during this cycle the ringing voltage is forced thru diodes CR1 and CR2 and out thru the now closed though normally opened contacts HG1-13 and HG1-11 of relay HG1 to the ringing voltage bus 14.

The ringing voltage is half wave rectified by the two diodes and provides a pulsing D.C. voltage between $-50$ volts D.C. and $-200$ volts D.C.

During that 100 millisecond time period between the "ON" and "OFF" ringing cycles when the ringing relays that provided ringing were released we now operate all the ring relays to the lines that have been marked for Call Message Waiting. The pulsing D.C. voltage is applied thru these operated ring relays and fires the neon indicators across the TIP and RING conductors. This is continued for a 1 second period and again switches to an "ON" ringing cycle.

What is claimed is:

1. A signalling arrangement for applying a call waiting signal to selected ones of a plurality of telephone lines connected to a telephone exchange, wherein said exchange includes a ringing signal generator, a ringing signal distribution bus and a control means, and further including a rectifier means and a connect means comprising a relay having a set of make and break contacts operated to connect said ringing generator to said distribution bus via said make contacts and alternately to connect said ringing generator to said bus via said rectifier means and said break contacts, a ringing signal bus connect means associated with each telephone line for connecting said line to said ringing signal bus, and control means operative upon the indication of a call waiting condition for a particular line, to operate said ringing signal bus connect means associated with said line in the alternate periods of said connect means, whereby said ringing signal distribution bus is alternately used for distributing said ringing signal and said call waiting signal.

2. A signalling arrangement as claimed in claim 1, wherein: said connect means further includes a zero phase detector means connected to said ringing generator output and gated with said control means to said relay to operate and release said relay during zero current periods.

* * * * *